United States Patent [19]

Ladenberger et al.

[11] 4,207,409
[45] Jun. 10, 1980

[54] CATALYTIC HYDROGENATION OF DIOLEFIN POLYMERS

[75] Inventors: Volker Ladenberger, Schwetzingen; Klaus Bronstert, Carlsberg; Gerhard Fahrbach, Plankstadt; Wolfgang Groh, Mannheim, all of Fed. Rep. of Germany

[73] Assignee: BASF Aktiengesellschaft, Fed. Rep. of Germany

[21] Appl. No.: 952,804

[22] Filed: Oct. 19, 1978

[30] Foreign Application Priority Data

Nov. 2, 1977 [DE] Fed. Rep. of Germany ....... 2748884

[51] Int. Cl.$^2$ ................. C08F 8/04; C08C 19/02
[52] U.S. Cl. ................................ 525/338; 525/337
[58] Field of Search ........................... 526/25, 26

[56] References Cited

U.S. PATENT DOCUMENTS

| | | | |
|---|---|---|---|
| 3,644,588 | 2/1972 | Hassell | 260/879 |
| 3,673,281 | 6/1972 | Bronstert et al. | 526/25 |
| 3,756,977 | 9/1973 | Yoshimoto et al. | 526/25 |
| 3,769,256 | 10/1973 | Yoshimoto et al. | 526/25 |

*Primary Examiner*—William F. Hamrock
*Attorney, Agent, or Firm*—Keil & Witherspoon

[57] ABSTRACT

In the hydrogenation of polymers or copolymers synthesized from dienes, or containing diene hydrocarbons, which is as a rule carried out in an organic solvent using hydrogen in the presence of conventional complex hydrogenation catalysts based on metals of sub-group 8 of the periodic table of the elements and aluminum trialkyls it is important to have from 0.5 to 50 moles of water present in the hydrogenation zone per mole of the heavy metal component of the catalyst. The hydrogenation time can be substantially reduced by this measure.

3 Claims, No Drawings

CATALYTIC HYDROGENATION OF DIOLEFIN POLYMERS

The present invention relates to a process for hydrogenating diolefin polymers, which have been manufactured by anionic polymerization, in solution in the presence of a catalyst mixture comprising a soluble compound of iron, cobalt or nickel, an aluminum-organic compound and water.

Polymers of diene hydrocarbons still contain double bonds in the molecular chain. These double bonds can be hydrogenated by conventional methods. Such completely or partially hydrogenated products show improved resistance to aging, especially improved resistance to oxidative degradation, compared to non-hydrogenated polymers. In addition, the hydrogenated copolymers of dienes and vinyl-aromatics exhibit improved elongation at break, and improved strength. If they have been only partially hydrogenated, the diene polymers are still capable of undergoing vulcanization.

Catalytic hydrogenation of diolefin polymers in solution has been disclosed. In a process described in German Published Application DAS 1,215,372 the hydrogenation catalyst comprises A. an organic compound of a metal of sub-group VIII of the periodic table and
B. a metal-hydrocarbon compound.

Similar processes are described in U.S. Pat. No. 3,113,986 and in Chemical & Engineering News, Mar. 4, 1963, pages 34 et seq., where the organic metal compounds used are alkoxides of metals of groups IVB, VB, VIB, VIIB and VIII of the periodic table, eg. the diacetylacetonates of nickel and chromium.

However, it has been found that the processes still suffer from shortcomings. For example, occasionally the hydrogenation reaction only starts some time after introduction of the hydrogen or requires relatively long reaction times.

It is an object of the present invention to provide an improved process for hydrogenating diolefin polymers.

We have found that this object is achieved by providing a process for catalytically hydrogenating diolefin polymers, which have been manufactured by anionic polymerization, by treating a solution of the polymer in an inert organic solvent with hydrogen in the presence of a catalyst mixture comprising A. a soluble compound of iron, cobalt or nickel and
B. an aluminum-organic compound,
wherein the hydrogenation is carried out in the presence of from 0.5 to 50 moles of water per mole of the soluble iron, cobalt or nickel compound.

The addition of water results in substantially more rapid hydrogen uptake, so that the hydrogenation time is greatly reduced. In the presence of water, hydrogenation to the point of saturating more than 98% of the olefinic double bonds is complete in about 1 hour. Without added water, the hydrogenation requires several hours. Furthermore, the hydrogen uptake frequently only starts after adding water.

The process according to the invention can be used for hydrogenating any polymer of a conjugated diene, for example homopolymers or copolymers of butadiene, isoprene, 2,3-dimethylbutadiene, piperylene and the like. Amongst the copolymers, those with vinyl compounds, eg. with styrene, substituted styrenes, acrylic esters and methacrylic esters, deserve particular mention. In the copolymers, the monomers may have a random distribution over the entire polymer chain, or block copolymers or segment copolymers may be concerned in which a homopolymer block X is linked to one or two homopolymer blocks Y. Graft copolymers, eg. of vinyl-aromatics onto diene polymers, can also be hydrogenated. The polymers may have number-average molecular weights of from 1,000 to 1,000,000 (determined in toluene at 37° C., using a Knauer membrane osmometer) and have been manufactured by anionic solution polymerization using organo-metallic catalysts, for example catalysts based on sodium, potassium, lithium or especially lithium alklyls.

In preferred embodiment of the invention, the hydrogenation is carried out directly following the polymerization, in the same reaction medium, at a concentration of from 1 to 80, preferably from 15 to 25, percent by weight of polymer, based on the solution.

The hydrogenation is carried out in solution in an inert organic solvent. Polybutadiene oil can also be hydrogenated in the absence of a solvent. The term "inert" means that the solvent does not react with the hydrogenation reactants. Examples of suitable solvents are aliphatic hydrocarbons, eg. hexane and heptane, and ethers, eg. diethyl ether and tetrahydrofuran. Aromatic hydrocarbons, eg. benzene, toluene and ethylbenzene, can only be used if the aromatic double bonds are not attacked under the chosen hydrogenation conditions.

The component A of the catalyst mixture is a compound of iron, cobalt or nickel, containing these metals in the divalent or trivalent state. Suitable anions are both inorganic and organic radicals, the use of acetates, acetylacetonates or naphthenates being preferred. The compounds should be soluble in the organic solvent used to dissolve the polymer, ie. the solvent should dissolve at least the amount of catalyst component required for the hydrogenation.

The component B consists of an aluminum-organic compound. Preferred compounds are aluminum trialkyls, eg. aluminum trimethyl, aluminum triethyl and aluminum triisobutyl, but aluminum alkyl hydrides, aluminum alkyl esters and aluminum alkyl halides may also be used.

The catalyst components are employed in a molar ratio A:B of from 1:40 to 1:1. Preferred ratios are from 1:10 to 1:2. The most advantageous ratio in any particular case depends on the nature of the components and can be determined by a simple series of experiments. If nickel(II) acetylacetonate is used as component A and aluminum triisobutyl as component B, the optimum ratio A:B is, for example, about 1:4, whilst for iron acetylacetonate it is 1:5.

Water is added to the solution to be hydrogenated, in such amount as to provide from 0.5 to 50, preferably from 5 to 25, moles per mole of component A.

As a result of adding water, in accordance with the invention, to the polymer solution containing the catalyst complex, it becomes possible to use very low catalyst concentrations. The hydrogenation can be carried out at concentrations of less than $10^{-3}$, and down to about $10^{-6}$, mole of component A per liter of solution. In general, from $5 \cdot 10^{-5}$ to $5 \cdot 10^{-4}$ mole of component A is used per liter of solution.

The catalyst complex is prepared by mixing the individual components, advantageously in an inert organic solvent, under an inert gas, eg. $N_2$, $H_2$ or Ar, at from $-20°$ to $120°$ C. This causes the components to react with one another and the actual catalyst complex, which in most cases is deeply colored, is formed. Presumably the metal is converted to a lower valency during this reaction, but is evidently not obtained in a metallic form, and instead is kept in solution as a complex, or remains colloidally dispersed in the solvent. In this form, the catalyst complex can be directly added to the polymer solution to be hydrogenated. The water is added to the batch after the addition of components A and B.

The hydrogenation is carried out with elementary hydrogen, which is advantageously introduced into the polymer solution as a gas. Hydrogen pressures of from 1 to 200 atmospheres may be used, those from 1 to 50 atmospheres being preferred. During the hydrogenation, the polymer solution is stirred vigorously so as to enable the hydrogen introduced to come sufficiently rapidly into contact with the polymer. The hydrogenation may be carried out at from +20° to 200° C., preferably from 40° to 140° C. Since the catalyst complexes are sensitive to oxygen, the process is advantageously carried out in the absence of oxygen. The hydrogenation reaction takes place very rapidly and normally 100% hydrogenation is achieved after only a few hours. We have observed that terminal olefinic double bonds, for example at chain ends or on vinyl side groups, undergo more rapid hydrogenation than double bonds in middle positions, for example the 1,4 double bonds formed on polymerizing dienes. Hence, if desired, selective hydrogenation can also be carried out. If the hydrogenation is stopped prematurely, partial hydrogenation occurs, with vinyl groups in side positions reacting preferentially or reacting first.

Given sufficient availability of hydrogen, the hydrogenation proceeds to a total degree of unsaturation of less than 10%, ie. at least 90% of the olefinic double bonds originally present in the polymer undergo hydrogenation. The degree of unsaturation is measured by conventional methods, eg. IR spectroscopy or determination of the iodine number. Under mild conditions, aromatic double bonds, eg. those present in copolymers of dienes and vinyl-aromatics, are not hydrogenated. However, at elevated hydrogen pressures, advantageously above 10 atmospheres, and with a relatively high molar ratio of A:B, it proves possible also to hydrogenate aromatic double bonds.

After the hydrogenation, the hydrogenated polymer is isolated from the solution. For this purpose, the catalyst complex may first be destroyed by adding acidified water to the polymer solution. The aqueous phase is then separated from the organic phase.

Finally, the polymer can be isolated from the catalyst-free polymer solution by conventional methods, for example by evaporating the solvent or by precipitating the polymer with methanol.

The hydrogenated polymers formed are used as a plastics raw material, in the rubber industry, as the soft component in compounding high-impact thermoplastics, or as a lubricating oil additive.

EXAMPLE 1

(a) Preparation of the diolefin polymer 0.9 liter of butadiene and 0.5 liter of styrene are dissolved in 4.8 liters of cyclohexane in the presence of 15 ml of tetrahydrofuran. 16.5 ml of a 10% strength solution of n-butyl-lithium in n-hexane are added to the monomer solution and the batch is polymerized for one hour at from 60° to 70° C. A butadiene-styrene copolymer with random distribution of the monomer units is obtained. The polymer has a number-average molecular weight of 70,000 (determined in toluene at 37° C., using a Knauer membrane osmometer).

(b) Hydrogenation 0.3 g of nickel-II acetylacetonate, dissolved in 9 ml of toluene, and 11 ml of a 10% strength aluminum triisobutyl solution in hexane are added to the polymer solution obtained as described in a). The catalyst components are mixed with the polymer solution at from 25° to 30° C. After adding the hydrogenation catalyst and closing the hydrogenation reactor, hydrogen to a pressure of 10 bars is introduced into the reactor. Initially, no hydrogen uptake is observed. The latter only starts after adding 0.3 ml of water (14 moles per mole of nickel acetylacetonate) and ceases after 1 hour.

A polymer is obtained, in which the proportion of non-hydrogenated olefinic double bonds (determined by the method of Wijs, Angew. Chemie 11 (1898), 291) is less than 2%.

The Table shows the result of hydrogenating the copolymer, prepared in Example 1, with the same hydrogenation catalyst in the presence of different amounts of water.

| Molar ratio Ni:H$_2$O | Hydrogenation time required to give <2% of residual double bonds |
|---|---|
| 1:1 | 2.0 |
| 1:5 | 1.5 |
| 1:14 | 1.0 |
| 1:40 | 3.5 |

If the above procedure is followed without adding water, the hydrogen uptake starts delayed, and is very slow. The hydrogenation time required to give less than 2% of residual double bonds is more than 6 hours.

We claim:

1. A process for catalytically hydrogenating diolefin polymers manufactured by anionic polymerization, by treating a solution of the polymer in an inert organic solvent with hydrogen in the presence of a catalyst mixture comprising A. a soluble compound of iron, cobalt or nickel and
B. an aluminum-organic compound, wherein the catalyst mixture in an inert solvent is added to the polymer solution to be hydrogenated, water is then added to the polymer solution in the amount of from 0.5 to 50 moles of water per mole of the soluble iron, cobalt or nickel compound, and the diolefin is hydrogenated in the presence of the water, whereby at least 90% of the olefinic double bonds are hydrogenated.

2. The process of claim 1, wherein from 5 to 25 moles of water per mole of the soluble iron, cobalt or nickel compound is added to the polymer solution.

3. The process of claim 1, wherein the anionic polymerization was carried out in the presence of a lithium catalyst.

* * * * *